United States Patent Office 2,782,672
Patented Feb. 26, 1957

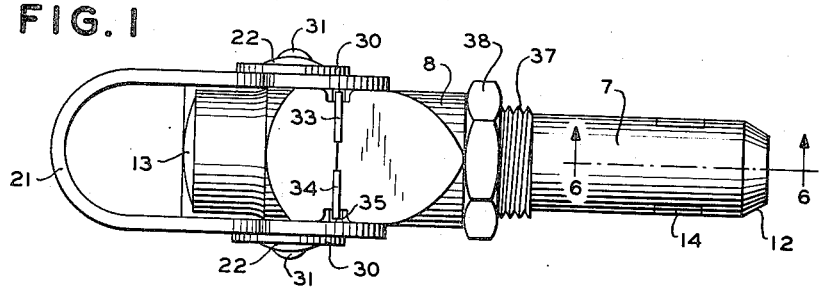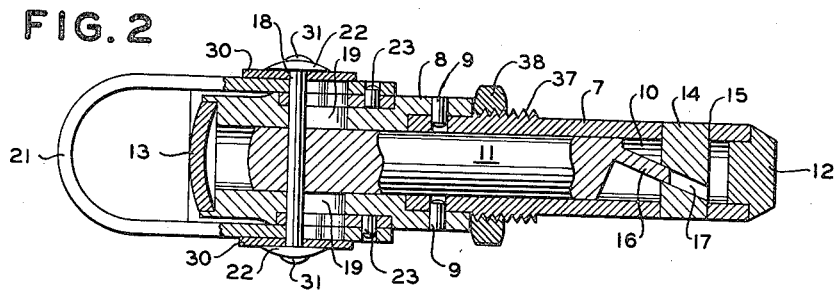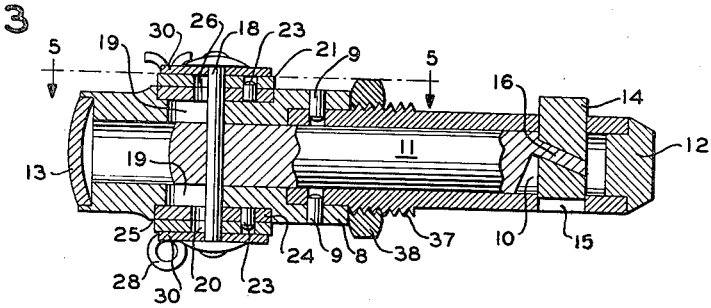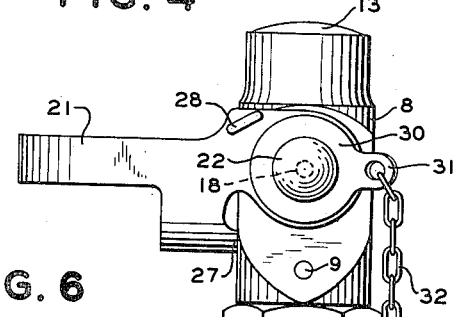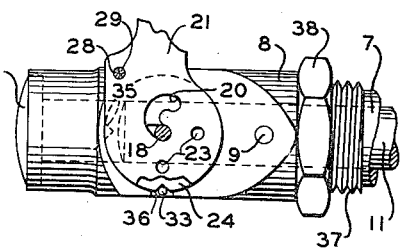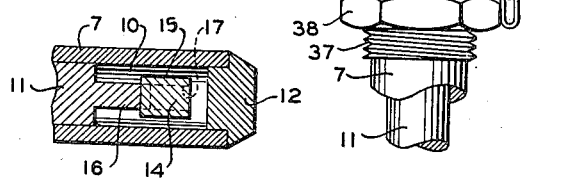
INVENTOR.
FRANK L. DAVIS

2,782,672

LOCK PIN HAVING ECCENTRICALLY ACTUATED PLUNGER AND COOPERATING LOCKING SLIDE MEANS

Frank L. Davis, College Point, N. Y., assignor to Davis Aircraft Products Inc., New York, N. Y., a corporation of New York Application March 11, 1954, Serial No. 415,460

5 Claims. (Cl. 85—5)

The invention disclosed in this patent is a pin or bolt construction for coupling and securing parts together, and the general objects of the invention are to provide a fastener of this type which can be freely inserted and then be immediately and securely locked in place wholly from the outer end of the structure.

Further objects of the invention are to provide this pin fastener or coupling in a form having the actual holding strength of a bolt of corresponding dimensions and to keep the locking mechanism and the actuating means therefor down to small dimensions which will not interfere with use of the pin in limited space locations.

Other objects of the invention are to provide the pin in a simple, rugged structural form which can be hammered at opposite ends without injury to the parts, which, after locking, can be secured by safety wire, cotter-pin or the like and left in the locked condition and which will have provision for attachment of a chain connection or the like to prevent loss when not in actual use.

Additional objects are to provide simple actuating mechanism which will show by its position the state of the locking mechanism and which will be automatically retained in either the locked or unlocked position of parts.

Other desirable objects attained by the invention are set forth or will appear in the course of the following specification.

The drawing accompanying and forming part of the specification illustrates a practical commercial embodiment of the invention but structure may be modified and changed as regards this particular illustration, all within the true intent and scope of the invention as hereinafter defined and claimed.

Fig. 1 in the drawing is a side elevation of the pin with the locking mechanism in the retracted position and the pin ready for insertion in an opening in which it is to be used;

Fig. 2 is a broken longitudinal sectional view of the pin with the parts in the same relation;

Fig. 3 is a similar sectional view but showing the actuating lever or yoke turned down to project the locking slide;

Fig. 4 is a broken side elevation of the outer or head portion of the device showing the yoke turned down to lock the pin and a cotter pin inserted to secure the yoke in the locking position;

Fig. 5 is a broken sectional detail showing the shape of the cams on the yoke which effect longitudinal movement of the plunger accomplishing transverse movement of the locking slide, this view taken on substantially the plane of line 5—5 of Fig. 3;

Fig. 6 is a broken part sectional view illustrating the inclined sliding cam connection between the inner end of the plunger and the locking slide, taken on substantially the plane of line 6—6 of Fig. 1.

The body of the pin is shown in the form of a cylindrical barrel or tube 7 having a tubular extension head 8 fixed over the outer end of the same by shear pins 9 or the like.

A cylindrical bore 10 extends continuously through the tubular portion and head and for the sliding operation of a cylindrical plunger 11 therein.

Opposite ends of the bore 10 are closed by drive plugs or caps 12, 13, so that the pin may be driven without harm at either end.

Locking of the pin is effected by a cross-slide 14 shown as rectangular in cross-section and operating in a correspondingly shaped passage 15 through the inner end portion of the tubular pin body.

As shown in Figs. 1 and 2, this locking slide is of a length equal to or no greater than the diameter of the pin and has its ends rounded to the periphery of the pin so as to seat flush in the pin in the retracted position.

Projection and retraction of the slide is effected in the illustration by a reduced cam extension 16 on the inner end of the plunger, inclined to the longitudinal axis of the pin and slidingly operating in a correspondingly inclined bore 17 in the slide.

Fig. 3 shows how the plunger 11 in its innermost position will, through the cam and slot connection 16, 17, project the locking slide 14 at one side of the pin sufficiently to lock the pin against withdrawal from an opening in which it may be seated, without disengaging the opposite end of the slide from the opposite wall of the tubular pin, thus to leave the cross-slide fully supported at both ends and fully capable of carrying the heaviest shear load for which the pin is designed.

The square cross-section of the slide holds it guided against rotational tendencies, keeps the inclined cam connection in freely sliding relation and provides in the projected position maximum shear load carrying shoulders.

Slide projecting and retractive movement of the plunger is effected in the illustration by a cross-pin 18 extending through the outer end portion of the plunger, operating through longitudinal slots 19 in the head and engaged in eccentric kidney slots 20 in the parallel sides of a yoke 21 secured under the heads 22 of the cross-pin 18.

The ends of the operating yoke or handle 21 are pinned at 23, Figs. 2, 3 and 5, to discs 24 journaled in circular bearing cavities 25 in the sides of the head 8 so that said yoke rotating concentrically with these bearing discs will, through cam slots 20 and pin 18, effect the desired longitudinal movement of the plunger. The bearing discs have kidney slots 26 corresponding to and in line with the like slots 20 in the arms of the yoke.

To prevent overthrow of the actuating handle 21, the latter is shown as having a stop portion 27 positioned to engage the side of the head structure when the handle is turned at right angles to the pin, projecting the cross-bolt or locking slide to fully extended position.

The yoke may be secured in this locking position by means of a cotter pin, safety wire or like fastening 28 extended through registering openings 29 in the sides of the yoke, such securing elements then engaging the side of the head to hold the yoke against return, bolt releasing movement.

To prevent loss of the pin when not in actual use, discs 30 are shown secured under the heads 22 of cross-pin 18, having lugs 31 for attachment of loss preventing chains, wires or the like, 32.

To aid in holding parts in the locking and release positions, a spring cross-wire 33 is shown in Fig. 1, secured in an overturned cross-slot 34 in the head, in position for its ends to engage indexing notches 35, 36, Figs. 1 and 5, in the edges of the bearing discs 24.

The yoke 21 pivotally supported by bearing discs 24 and operating through cam slots 20, 26 on the cross-pin 18, exerts leverage on the plunger capable of shifting the plunger longitudinally and the locking slide transversely against friction or other possible retardant or obstacle. When the pin is not in use the locking slide closes both ends of the cross-passage in the pin, with all operating parts practically sealed or at least closed against dust and foreign matter. The locking and unlocking action is positive and reliable and will not shake loose. Further, if desired, the lock mechanism may be secured fast against release.

In some cases it may be desirable to take up any slack there might be between the head of the pin and the locking slide. For this purpose the body of the pin may be screw-threaded as indicated at 37 adjoining the head and a lock-nut or stop-nut 38 be located on this screw-threaded portion, adjustable thereon toward and away from the locking slide. This nut may be used after the pin has been located in holding position by turning it down against the secured object or objects.

What is claimed is:

1. In a lock pin having a transversely shiftable locking slide at the inner end and a longitudinally shiftable plunger connected to project and to retract said slide, a cross-pin on the outer end of said plunger projecting to opposite sides of the locking pin, bearing discs journalled on a common axis on said opposite sides of the locking pin and having cam slots extending from said axis toward the rims of said discs and through which the projecting ends of the cross-pin pass and an operating yoke having spaced sides overlying and connected with said bearing discs and having cam slots through which said projecting ends of the cross-pin extend and which substantially coincide with the slots in the bearing discs and whereby rocking movement imparted to said yoke will be effective through said cam slots and cross-pin to shift said plunger longitudinally for projecting and retracting said locking slide.

2. The invention according to claim 1 in which the lock pin has circular seats in opposite sides of the same in which the bearing discs are journalled, said seats being open at one side, a spring wire being mounted on the lock pin with opposite ends of the same projecting into said openings in the sides of the seats and the bearing discs having notches in the edges of the same engageable by the ends of said spring wire for indexing and yieldably retaining the discs in predetermined positions.

3. The invention according to claim 1, in which the lock pin has a screw threaded portion at a point separated from the locking slide and an abutment nut engaged on said screw threaded portion and thereby providing a stop adjustable toward and away from the locking slide.

4. The invention according to claim 1 in which the lock pin is provided with longitudinally extending guide slots for the projecting end portions of said cross-pin arranged to hold the plunger against rotation and in proper cooperating connection with the transversely operating locking slide.

5. The invention according to claim 1 in which the lock pin has circular seats in opposite sides of the same in which the bearing discs are journalled and in which heads are provided on opposite ends of said cross-pin overstanding the sides of said yoke for rotatably confining the bearing discs in said seats.

References Cited in the file of this patent

UNITED STATES PATENTS

| | | |
|---|---|---|
| 346,033 | Fitzgerald | July 20, 1886 |
| 677,907 | Vandeleur | July 9, 1901 |
| 720,322 | Burkholder | Feb. 10, 1903 |
| 962,368 | Long | June 21, 1910 |
| 1,106,159 | Rawlins | Aug. 4, 1914 |
| 1,111,235 | Redin | Sept. 22, 1914 |
| 2,324,175 | Simms | July 13, 1943 |
| 2,377,086 | Lang | May 29, 1945 |